United States Patent [19]

Keeling

[11] 3,942,114

[45] Mar. 2, 1976

[54] SPEED DETECTOR AND INDICATOR FOR DC MOTORS

[76] Inventor: William E. Keeling, 302 Bethesda Drive SE., Huntsville, Ala. 35803

[22] Filed: Oct. 15, 1974

[21] Appl. No.: 514,694

[52] U.S. Cl............... 324/177; 246/182 R; 318/317

[51] Int. Cl.[2]........................................... G01P 3/46

[58] Field of Search............ 324/177; 318/317, 309, 318/312, 315, 490; 246/182 R; 317/5

[56] References Cited

UNITED STATES PATENTS 3,652,937 3/1972 Garrott.......................... 324/177 X

OTHER PUBLICATIONS

Henry G. and Patlach A., "Motor Tachometer Circuit", IBM Technical Disclosure Bulletin, Vol. 14, No. 7, Dec. 1971, pp. 1986–1987.

Butterworth H., "Speed Control for D.C. Model Motors", Wireless World, Sept. 1967, pp. 440–442.

*Primary Examiner*—Alfred E. Smith
*Assistant Examiner*—Rolf Hille
*Attorney, Agent, or Firm*—Nathan Edelberg; Robert P. Gibson; Jack W. Voigt

[57] ABSTRACT

A speed detector for a direct current motor is coupled substantially in parallel with the motor such that only the motor input voltage and a function of the input current are inputs to the speed detector/indicator system. Analog speed detection is provided by using either operational amplifiers or single stage transistor circuits to sample the current and voltage to generate a voltage proportional to speed of the motor.

7 Claims, 4 Drawing Figures

SPEED DETECTOR AND INDICATOR FOR DC MOTORS

DEDICATORY CLAUSE

The invention described herein may be manufactured, used, and licensed by or for the Government for Govermental purposes without the payment to me of any royalty thereon.

BACKGROUND OF THE INVENTION

One common speed indicator for model railroad application operates with a frequency meter for sensing the pole pulses generated when a direct current motor rotates. This pulse sensing type device interferes with operation of other desired equipment. For example, pulse power is used to jog small motors into an effectively slow rotation speed at an effectively high available torque at low average terminal voltage to achieve smooth, slow starts. Pulse power starting or operating equipment can interfere with the speed indication signal. High frequency lighting and signaling features can interfere with speed indication. Motor pulses used for speed indication may also interfere with high frequency signals. All of these signals include frequency components that interfere with operation of speed indicating equipment. The pulses generated by DC motors used by presently available speed indicators, stress transistorized throttles and high frequency generators. It is desirable to eliminate these pulses and the attendant noise, preferably by filtering at the source. However, filtering out these pulses and noise virtually incapacitates presently available commercial speed indicators. Further, when, in model railroad application for example, two or more units may be multi-headed, and though the motors are loosely mechanically coupled, the motors run at different speeds due to different wheel diameters and gear ratios. When such units are matched so that multi-heading is possible, the net per unit speed is thus also matched. With the speed detector/indicator, accurate speed indication is possible whereas with the prior art frequency detecting type instrument, this is not practical. Also, on some larger industrial DC motors a separate tachometer composed of a permanent magnet or separately excited DC generator is employed to indicate speed. This method of sensing speed results in separate equipment mounted on the outer motor housing or incorporated in the motor and utilize separate wiring leads from the motor to related indicator or control circuits.

SUMMARY OF THE INVENTION

A speed detecting system for DC motors is disclosed wherein only motor input terminal voltage and a function of input terminal current are inputs to the system. A speed indicator coupled substantially in parallel with the motor, responds to the throttle voltage coupled to the motor and to a function of current to provide an analog signal which is indicative of the motor speed. The speedometer allows analog speed indication to be provided for DC permanent magnet motors using fixed excitation. Either operational amplifiers or single stage transistor circuits are coupled to the motor input terminals or motor throttle to provide the sampling function. The principle is also applicable to AC/DC motors provided that provision is made for field reversal and field current phase shift. If the field is excited from the line voltage the phase shift is approximately constant. In this case, with fixed phase shift compensation, the output from the speed detector need only to be rectified to develop a voltage whose average value is proportional to motor speed. Since DC meter movements respond to average current values, the meter will accurately indicate speed with this embodiment.

DESCRIPTION OF THE PREFERRED EMBODIMENT

The existence of integrated circuit DC operational amplifiers allows the sensing of motor speed from motor terminals without requiring separate equipment such as a tachometer and without the attendant separate wiring. Utilizing the input terminal voltage and terminal current to indicate motor speed allows speed indication to be obtained in a simple, reliable manner affording considerably longer life expectancy of operating equipment over prior art systems and without attendant problems associated with these other systems. The speed indicating system DC motors is disclosed to comprise one or more amplifiers arranged to solve the equation for speed, $$S = K_A (V - K_B I)$$

where $S$ is speed in whatever units are desired (RPM, MPH, etc.), $K_A$ is a constant in units of speed per volt, $K_B$ is a constant in units of ohms, $V$ is input terminal voltage, and $I$ is input terminal current.

A mathematical development of the equation and important constants includes the following general relationships.

Developed power (motor armature output) = torque x speed; and

Developed power (motor armature output) also = input power − electrical losses, and Developed torque (motor armature) = $K_T$ x current, where $K_T$ is a constant relating armature current to torque in a given motor with fixed field strength.

Equations are:

(1)

$$P_o = T \times S\ (746/550)\ \text{watts},$$

where $P_o$ = power output in watts (shaft), $T$ = torque in ft-lbs (shaft), $S$ = speed in rev/sec, 746 watts = 1 hp, and
550 ft-lbs/sec = 1 hp;

(2)

$$P_o = VI - I^2R$$

(The $VI$ term is valid for instantaneous values as well as DC), where $V$ = terminal emf in volts,
$I$ = current in amperes, and
$R$ = armature and brush resistance in ohms;

(3)

$I = K_T I$, and (4)

$S = P_o/T$ revolutions per second.

Substituting equation (2) and (3) into (4) results in:

$$S = \frac{VI - I^2R}{K_T I} = \frac{V - IR}{K_T} \text{ rev./sec., and}$$

$$S' = K_o \frac{V - IR}{K_T},$$

where $S'$ = speed in rpm or other appropriate terms, and
$K_o$ = constant relating motor rps to $S'$.

For a particular motor, $K_o$, $K_T$ and $R$ are constant. Therefore:

$$S' = K_1 V - K_2 I$$

where $K1 = K_o/K_T$ and
$K2 = K_o R/K_T$.

Examining the above formulas for $K_1$ and $K_2$, it is obvious that $K_o/K_T$ is common to both. Thus, a better generalized expression is (5)

$$S' = K_A (V - K_B I)$$

Where:

$K_A = K_o/K_T$ and
$K_B = R$

Equation (5), which is the speed equation, is a more practical form for implementing a speedometer.

The development of the equation for speed shows that the character of the two constants $K_A$ and $K_B$ can be reduced such that $K_A$ is defined as the ratio of speed to back emf (motor operating as a generator under no load conditions); and $K_B$ is defined to be the total input resistance from the point where the speed indicator is connected across the line to the motor back to the return terminal of the line to the motor.

Figure 1:
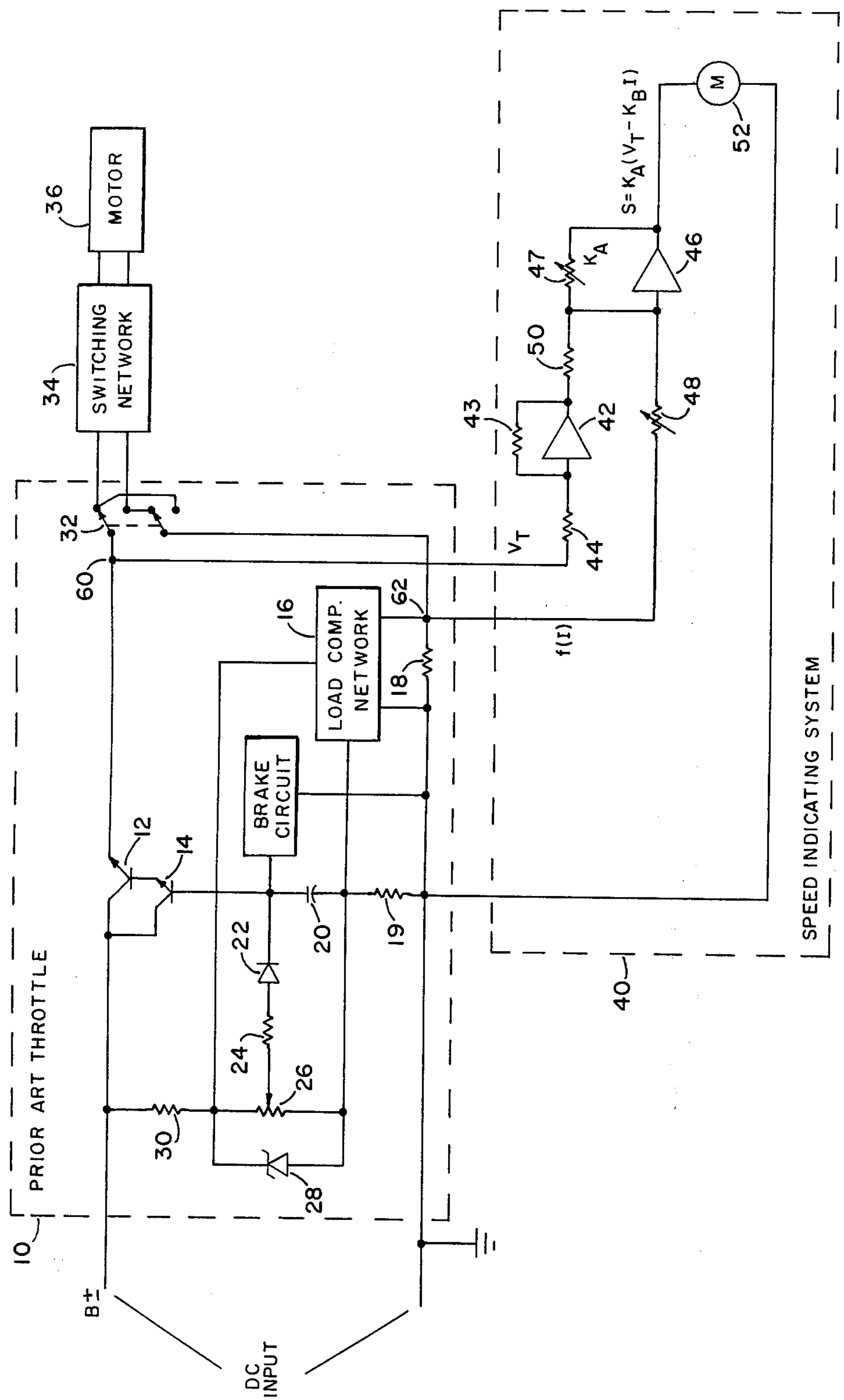
FIG. 1 discloses a preferred embodiment of a simplified diagram of the electrical circuit for providing speed detection and indication of a throttle controlled motor.

As shown in FIG. 1, a typical prior art throttle 10 contains a series regulator power output transistor 12 and may also include one or more driver transistors 14, depending on the throttle design. A current compensation network 16 is operated by a current sensing resistor 18. Such throttles also use a momentum simulation device such as a capacitor 20 whose size depends on circuit design, usually 25–2,000 microfarads, a back voltage diode 22 and a current limiting resistor 24. Capacitor 20 is coupled on one side to transistor 14 and on the other side is coupled through a resistor 19 to ground. Resistor 19 may or may not be present depending on whether load compensation or preset starting voltage (offset voltage) is utilized. Resistor 19 may be impressed with a fixed start voltage or a variable voltage resulting from the current compensation network or both. The voltage command or throttle setting is accomplished with a potentiometer 26 coupled across the input lines which feed the motor. Because of line voltage irregularity and circuit design, including offset voltage and current compensation, it is usually desirable to regulate the voltage across the throttle potentiometer as shown with a zener diode 28 and current limiting resistor 30. The current compensation network 16 often has a built-in offset voltage since direct current motors will not start at very low voltages and a time delay is required to build starting voltage from the throttle potentiometer 26 coupled with the momentum simulation circuits 20, 22, and 24. Another feature often incorporated in the advanced throttle having momentum simulation is a brake connected from the junction of capacitor 20 and diode 22 to ground. Diode 22 may not be present if the throttle potentiometer is used also as a brake or another diode and resistor may be paralleled with diode 22 and resistor, with the diode reversed to provide different acceleration and deceleration characteristics.

Throttle 10 may be connected to a reversing circuit 32 which may be either a reversing switch or reversing relay to reverse the polarity of voltage coupled to the motor and change the direction of rotation. If a relay is used, a reverse interlock may be incorporated to prevent reversal while the motor is already rotating. The output from reversing circuit 32 is then connected through a switching network 34 to the motor 36 by way of conductive means such as wire leads and pickup shoes.

The speed indicating system 40 includes an operational amplifier 42 having a feedback resistor 43 and an input resistor 44. A second operational amplifier 46 has a feedback potentiometer 47 and an input potentiometer 48 and input resistor 50 coupled thereto. Amplifiers 42 and 46 may be single-ended operational amplifiers. The output of operational amplifier 42 is coupled through the input resistor 50 into operational amplifier 46. Also a voltage, $f(I)$, from the current sensing resistor 18 is coupled through input potentiometer 48 to amplifier 46. The output of amplifier 46 is coupled to a load circuit 52, which may for example be a speed indicating voltmeter. The other side of load circuit 52 is connected to a system ground in common with the prior art throttle. An input voltage $V_T$ is coupled from the motor line voltage, typically at point 60 in throttle 10, through input resistor 44 to operational amplifier 42. Similarly, the voltage developed across the current sensing resistor 18, which is proportional to motor current, is directed to input potentiometer 48 of amplifier 46.

Figure 2:
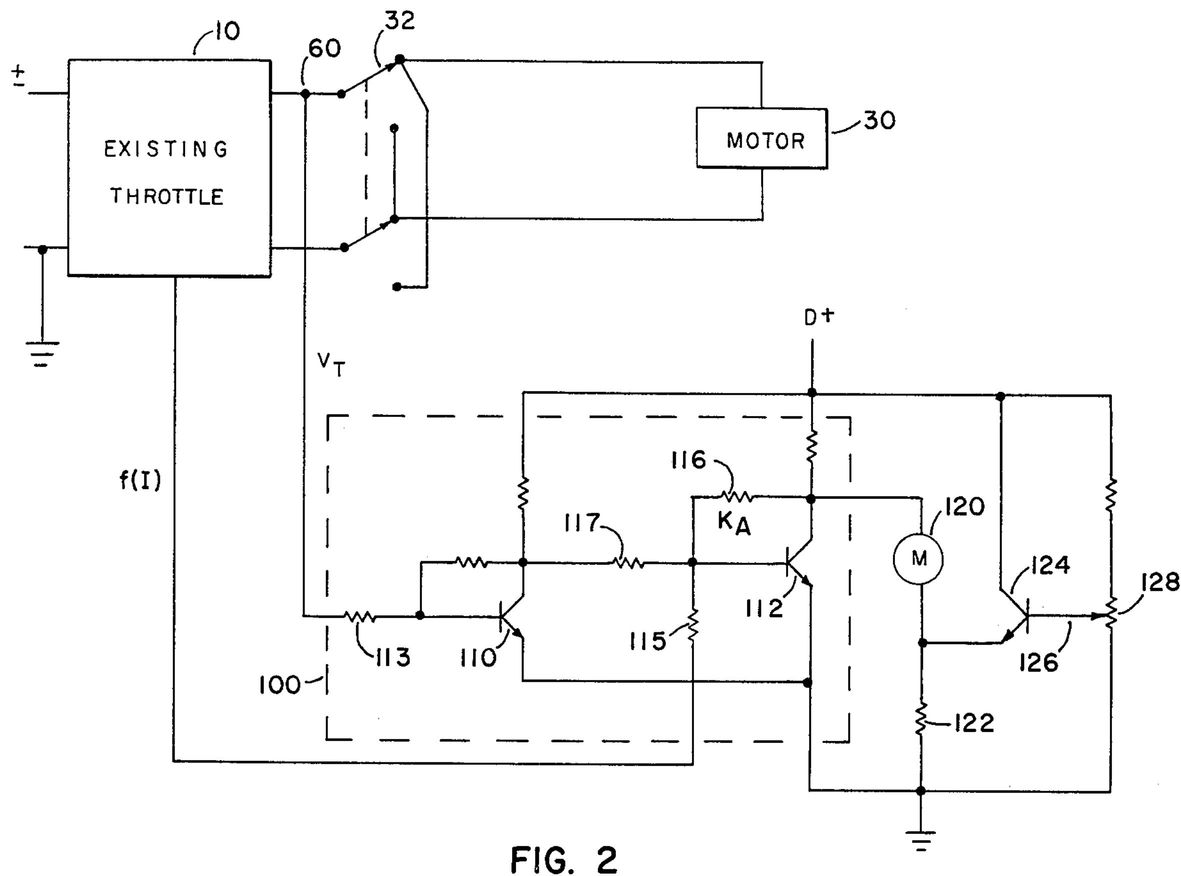
FIG. 2 is a partially schematic and partially block diagram of another embodiment of the speed detector system.

FIG. 2 discloses a more simplified implementation of the invention wherein the use of simple transistor circuits eliminates need for the additional power supplies required to operate the operational amplifiers (not shown in FIG. 1). In FIG. 2, existing throttle 10, switch 32 and motor 36 are shown in simplified form. A speed indicating system 100 has first and second transistor amplifiers 110 and 112 replacing the operational amplifier circuit of FIG. 1. In this circuit, to operate linearly, an offset voltage must be provided across the output to meter 120 due to partial conduction of both amplifier transistors 110 and 112, with no signal inputs to the speed indicator. The emitters of transistors 110 and 112 are coupled directly together and to the system ground. The input signal $V_T$ is coupled through input resistor 113 to the base of transistor 110, and the input signal $f(I)$ is coupled through input resistance 115 to the base of transistor 112. Resistor 117 is connected between the collector of transistor 110 and the base of transistor 112. The collector of transistor 112 is connected to a load circuit 120 which may be a voltmeter, with the other side of load 120 connected through a resistance 122 to ground. A third transistor 124 has the emitter coupled to the junction between meter 120 and resistor 122 and the base coupled through the variable arm 126 of potentiometer 128. The fixed arms of potentiometer 128 are connected between a power source D+ and ground. The power source is further coupled to the respective transistor collectors for supplying operating potential thereto.

For linear operation of transistor amplifiers 110 and 112 the circuit must possess an offset voltage on the output to load 120 due to partial conduction of both amplifier transistors, with no inputs at the input terminals. To cancel this offset voltage the circuit of potentiometer 128, transistor 124 and load resistor 122 is provided. This circuit compensates for offset voltage in the transistors. This embodiment of the invention has the disadvantage of lower gain at both stages introducing more error in the detector.

Figure 3:
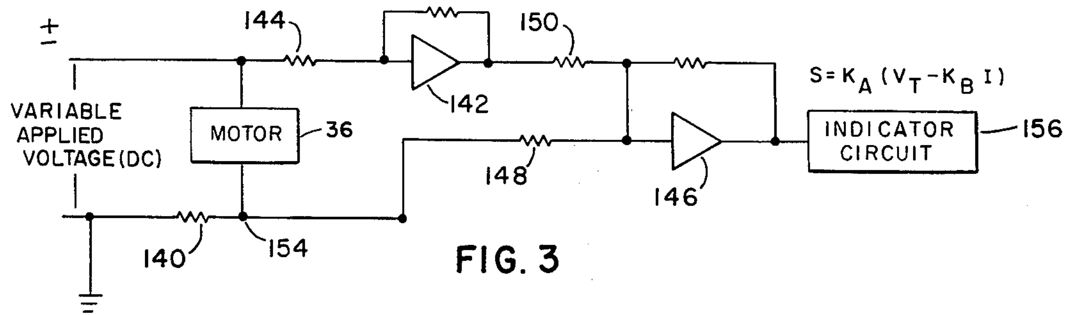
FIG. 3 is a simplified embodiment of the inventive concept showing a speed detector/indicator circuit of operational amplifiers coupled directly across the line voltage feeding the motor.

FIG. 3 discloses a more general block diagram of the invention and is applicable to general DC motor speed indication. Motor 36 is coupled to either a variable or fixed direct current voltage source with a series resistor 140 connected between one terminal of the motor and the grounded or common terminal of the applied voltage signal. Resistor 140 is of low value and serves as the current sensing resistor. An inverting operational amplifier 142 has the input terminal thereof coupled through a resistance 144 to the variable voltage input of the motor. An operational amplifier 146 has an input thereof coupled through an input resistor 150 to the output of inverting amplifier 142. The input of amplifier 146 is also coupled through an input resistancee 148 to junction 154 between the sensing resistor 140 and motor 36. Operational amplifier 146 functions as an adder, adding the signals coming in from amplifier 142 ($V_T$) and from sensing resistor 140 $f(I)$. The output of adder amplifier 146, which is representative of speed, is then coupled to a motor speed indicator circuit 156.

Figure 4:
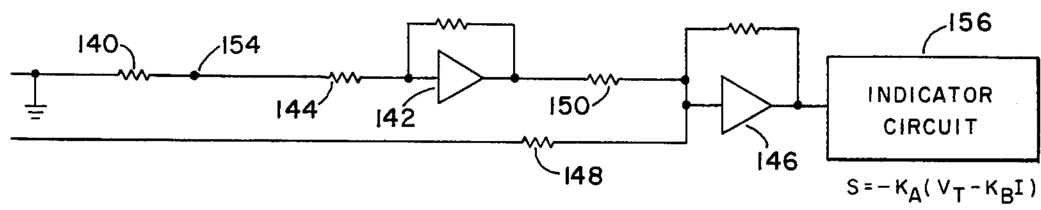
FIG. 4 is an embodiment of the invention set forth in FIG. 3, with the input to the speed detector reversed.

FIG. 4 discloses the same detector circuit as FIG. 3, showing the versatility of the system, with the $V_T$ input and $f(I)$ input being reversed to provide the negative output representative of speed. This is done merely by reversing the leads across the motor. Thus, input resistor 144 is coupled to terminal 154 and resistor 148 is coupled to receive $V_T$.

In operation of the speed indicating system of FIG. 1, the prior art throttle controls the speed and direction of rotation of motor 36 with reversing switch 32 allowing the direction of rotation to be reversed and potentiometer 26 controlling the motor speed. The variable voltage level ($V_T$) present at terminal 60 within throttle 10 is inverted by amplifier 42 of speed detector 40 and coupled to the input of adder operational amplifier 46. The signal level $f(I)$, developed across resistor 18 which is proportional to motor current is simultaneously coupled to adder amplifier 46 where it is combined with the output of amplifier 42. The constant term $K_B$ determined by the resistance between terminals 60 and ground of the prior art throttle (which is the resistance of the motor 36, the current sensing resistor 18, the switching network 34 and attendant system wiring) is dialed into potentiometer 48 so that the resistance of the potentiometer is proportional to $1/K_B$, which has units of conductance. A refinement of this detector/indicator circuit is obtained by placing another potentiometer in parallel with potentiometer 48, into which is dialed the conductance of the current sensing resistor 18, switching network 34, and attendant wiring. In this manner, only the conductance of the motor need be dialed directly into potentiometer 48, which is a convenience when either additional motors or different motors are used for motor 36. In this manner also, potentiometer 48 can have a direct dial reading in terms of motor conductance. The input terminal signals to operational amplifier 46 are acted upon by feedback through resistance 47 and is defined as the term $K_A$. Thus the output of operational amplifier 46 is representative of the speed which is equal to $K_A (V_T - K_B I)$. The signal is coupled through the load meter 52 for indicating the speed of the system.

Operating in a similar manner the speed indicating system of FIG. 2 discloses the offset voltage compensation circuit of transistor 124 to be coupled to produce a voltage in opposition to meet at the collector of transistor 112. Potentiometer 128 adjusts to output voltage at the emitter of transistor 124 for nulling out the DC offset signal present in the conventional transistor amplifiers. During operation of the motor the voltage $V_T$, indicative of the changing voltage signal developed across motor 36 is coupled through resistance 113 into amplifier 110 where it is amplified and coupled through resistor 117 to the base of amplifier 112, with the output thereof being collector coupled to meter 120. The signal representing the function of current $f(I)$ is coupled from the existing throttle 10 through resistor 115 to the base of amplifier 112 for coupling to meter 120. The feedback function $K_A$ is provided by resistor 116 coupled between the collector and base of amplifier 112. Similarly, the constant term $K_B$ is provided by resistor 115.

Obviously the term $V_T$ may vary depending on the particular throttle used, the potentiometer control used, and the resistance in series with the load. Similarly, the varying of current to the motor causes the $f(I)$ factor to change.

The speed detector may be utilized to drive control circuits or other items instead of or in addition to the indicator. For instance, the output of amplifier 46 in FIG. 1 or the collector of amplifier transistor 112 in FIG. 2 or the output of amplifier 146 in FIG. 3 may be connected to an integrator amplifier to produce a limited capacity odometer. In order to accomplish this with operational amplifier integrators and produce a positive output, the inverter amplifier would be placed in the current sense input as shown in FIG. 4 rather than the terminal voltage sense input. Another type odometer can be generated by driving a cumulative odometer wheels similar to those commonly found in automobiles with another motor whose speed is monitored by a second speed detector. The difference in speed indication between the two detectors is used to drive the odometer wheel motor such that the odometer motor speed is proportional to that of the motor whose total revolutions (or distance traveled, etc.) is being monitored. Thus, the odometer can accumulate indefinitely the total revolutions or distance traveled. Another possible application is to maintain a preset speed or just a constant speed as might be desired on a gyro or an industrial device requiring constant speed regardless of load. Therefore, this embodiment utilizes the speed detection device, whether speed is to be indicated or not.

Obviously, many modifications and variations of the speed indicator system are possible in view of the above disclosure. It is therefore, to be understood that within the scope of the appended claims, the invention may be practiced otherwise than as specifically described herein.

I claim:

1. In a motor control system having a motor for variable speed operation and a voltage throttle circuit for driving the motor, the improvement comprising: first and second amplifiers each having an input and an output, the output of said first amplifier being coupled to the input of said second amplifier, a first resistive means coupled between the output and the input of said second amplifier for providing adjustable feedback, an indicator circuit coupled to the output of said second amplifier for responding to any output signal therefrom, the inputs of said first and second amplifiers being coupled to said motor throttle circuit for receiving the input signals therefrom for providing an output. signal indicative of motor speed, and a second resistive means coupled between the input of said second amplifier and said motor throttle circuit for providing an adjustable signal thereto.

2. A speed detector system as set forth in claim 1 wherein the input of said first amplifier is coupled to said motor throttle circuit for receiving an input voltage signal therefrom, and the input of said second amplifier being coupled to receive a portion of said motor drive signal which is a function of motor current wherein said second resistive means is a first potentiometer connected between the input of said second amplifier and said motor throttle circuit.

3. A speed detector system as set forth in claim 2 wherein said amplifiers are operational amplifiers, said first amplifier being an operational amplifier with feedback, serving as an inverter and said second amplifier being an operational amplifier serving as an adder, said first resistive means is a second potentiometer, and said output signal from said amplifiers being indicative of motor speed as defined by the equation $S = K_A(V_T - K_B I)$ where $S$ is speed, $K_A$ is a constant in speed per volt provided by said second potentiometer, $K_B$ is a constant in ohms provided by said first potentiometer, $V_T$ is input terminal voltage, and $I$ is input terminal current.

4. A speed detector system as set forth in claim 3 and further comprising a current sensing resistor connected between one side of said motor and said voltage throttle circuit, said input of said second amplifier being coupled through said first potentiometer between said current sensing resistor and said motor for receiving said portion of said motor drive signal, and said input of said first amplifier being coupled directly to the other motor input.

5. A speed detector system as set forth in claim 3 and further comprising a current sensing resistor connected between one side of said motor and said voltage throttle circuit, said input of said first amplifier being coupled between said current sensing resistor and said motor for receiving said portion of said motor drive signal, and said input of said second amplifier being coupled through said first potentiometer directly to the other motor input.

6. A speed indicator system as set forth in claim 1 wherein said first and second amplifiers are discrete transistor amplifiers having the emitters thereof coupled in common to a system ground, the base of said second transistor being coupled through said first resistor to the collector output of said first transistor, the collector of said second transistor being the output connected to said indicator circuit, the base of said first transistor being the input coupled to receive said motor driving signal input; and further comprising a direct current voltage source coupled to said transistors for providing power thereto, said first resistive means is a second resistor coupled between the collector and base of said second transistor, and said second resistive means is a third resistor coupled between the base of said second transistor and said motor throttle circuit to receive said portion of said motor drive signal for providing an output signal indicative of motor speed as defined by the equation $S = K_A(V_T - K_B I)$, where $S$ is speed, $K_A$ is a constant in units of speed per volt provided by said second resistor, $K_B$ is a constant in ohms provided by said third resistor, $V_T$ is input terminal voltage, and $I$ is input terminal current.

7. A speed indicator system as set forth in claim 6 wherein said indicating circuit is a calibrated voltmeter having one side coupled to said second transistor collector and the other side coupled to ground; and further comprising an adjustable, offset voltage compensation network coupled to said voltmeter for cancelling offset signals thereto.

* * * * *